Dec. 1, 1942.　　　　M. W. HUMPHREYS　　　　2,303,554
APPARATUS FOR MAKING VULCANIZED RUBBER
Filed Aug. 2, 1940　　　2 Sheets-Sheet 1

INVENTOR.
MARION W. HUMPHREYS
BY
Kwis Hudson & Kent
ATTORNEYS

Dec. 1, 1942.  M. W. HUMPHREYS  2,303,554
APPARATUS FOR MAKING VULCANIZED RUBBER
Filed Aug. 2, 1940  2 Sheets-Sheet 2

INVENTOR.
MARION W. HUMPHREYS
BY Kwis Hudson & Kent
ATTORNEYS

Patented Dec. 1, 1942

2,303,554

UNITED STATES PATENT OFFICE 2,303,554

APPARATUS FOR MAKING VULCANIZED RUBBER

Marion W. Humphreys, Euclid, Ohio, assignor to The Ohio Rubber Company, Willoughby, Ohio, a corporation of Ohio Application August 2, 1940, Serial No. 349,674

11 Claims. (Cl. 18—6)

This invention relates to a method and apparatus for making vulcanized rubber, particularly sponge cord, in continuous manner.

The objects of the invention are to provide a method and apparatus which produce a superior grade of sponge cord from the standpoints of appearance, uniformity of density, and size, which are efficient and economical in their operation, which can be operated without any great degree of supervision, and which are reliable in operation with low upkeep cost.

Briefly stated, my invention contemplates the continuous production of sponge cord through the medium of a rotating vulcanizing drum provided at its periphery with any desired number of cavities in the form of annular grooves which extend completely around the drum each with a relatively narrow slot to admit of the infeed of the raw stock at one point in the periphery of the drum and the takeoff of the vulcanized finished sponge cord at another point in the periphery of the drum.

A cord of any desired shape or cross-sectional contour can be produced but generally it is made round in cross-section as its principal or most important use is in the production of so-called windlace or weatherstripping employed around the doors of automobiles. For making round cord, each cavity is therefore in the form of an annular groove whose cross-section is slightly less than a complete circle due to the presence of the narrow slot for the infeed of the raw stock and the takeout of the finished product. To close the groove and thus complete the cavity, the periphery of the drum for a suitable portion of its circumference is engaged by a closure member preferably in the form of a traveling belt which contacts with the surface of the drum for such portion of its periphery although in some instances this may be accomplished by a stationary shoe.

In order that the finished cord will be round or substantially round in cross-section, I employ for the ingress of the raw stock and for the egress of the finished cord a peripheral slot for the cavity which is narrower than the diameter of the raw stock and in fact is so narrow that provision is made for flattening or reducing the raw stock to a thickness somewhat less than the width of the peripheral slot of the cavity, and an important feature of the present invention resides in the fact that this not only performs the function of reshaping the stock to a thickness for entrance through the narrow slot of the cavity and feeding it into the cavity, but it has the additional function of calibrating the stock so that the finished cord will be of uniform diameter.

Due to the blowing action which occurs during a substantial part of the revolution of the drum, the stock is blown and enlarged so as to completely fill the cavity, and it is of course completely vulcanized before it leaves the drum so that it has a diameter several times that of the width of the slot. Accordingly, special provision is made for momentarily flattening the now vulcanized stock at the point of egress and causing it to be removed from the cavity without being abraded by the edges of the slot, and an important part of my invention resides in the method and means for accomplishing this result.

The invention may be further briefly summarized as consisting in certain novel steps of the improved method and in certain combinations and arrangements of parts of the apparatus for carrying out the method as will be more clearly described in connection with the accompanying drawings wherein Fig. 1 is a side elevation of the apparatus with certain portions thereof omitted and with the middle portion of the drum broken away and with a portion of the drum in section;

Figure 1:
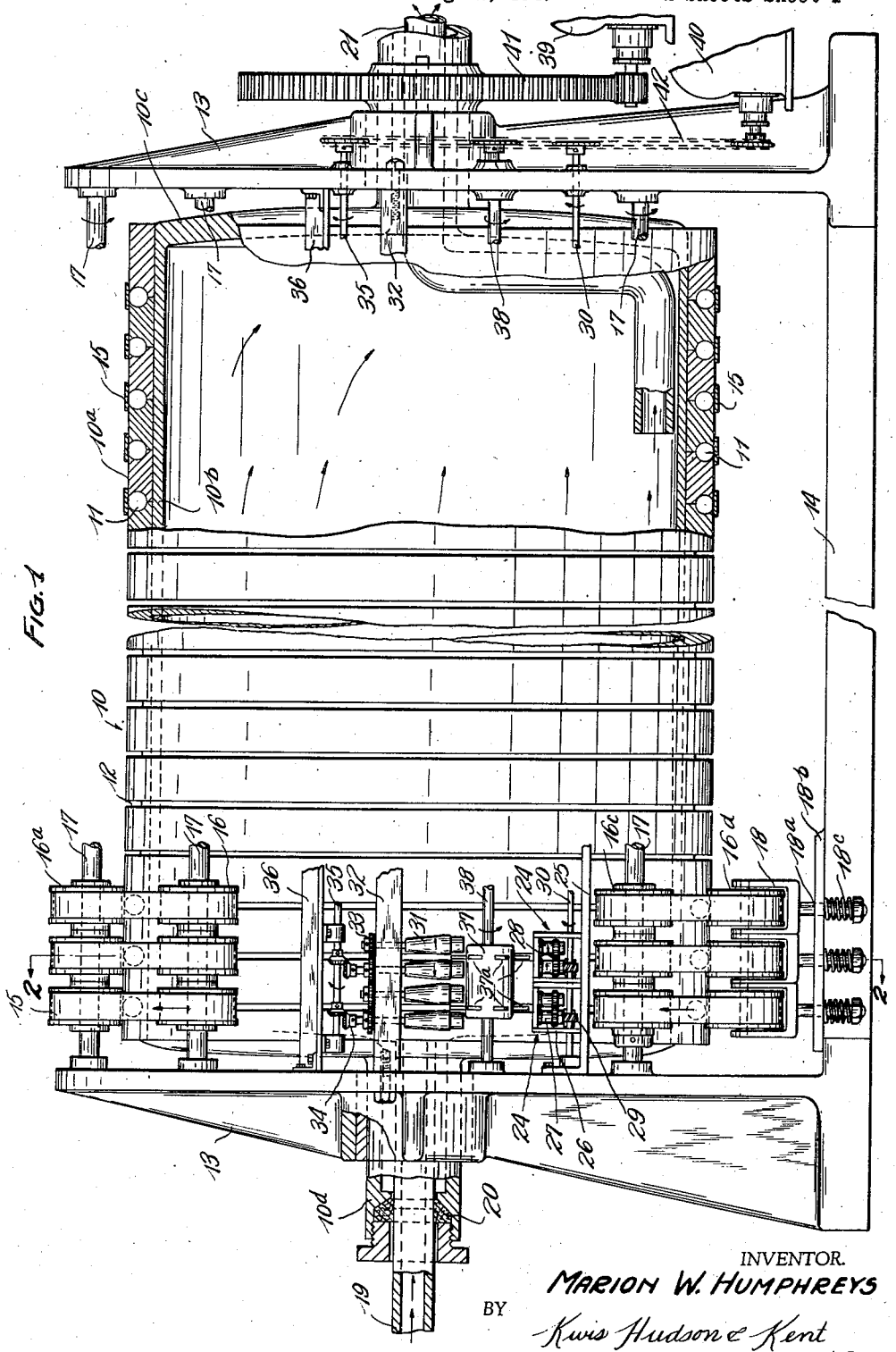

Referring now to the drawings, the apparatus involving my invention and for carrying out my improved method comprises a rotatable vulcanizing drum which is designated as a whole by the reference character 10. This drum, which is mounted to rotate about a horizontal axis, may have any desired length depending upon the number of cavities desired and the number of separate sponge cords which are to be produced at the same time. The method employed is the same at the various cavities, and the infeed mechanism and the takeout mechanism for each cavity are duplicates of those employed for the other cavities. Consequently, a description of these mechanisms for one cavity will suffice for all.

The drum here shown is provided at its periphery with a plurality of cavities 11 which in this instance are round in cross-section and are adapted for producing the usual round sponge cord used for the purpose stated in automobiles. These cavities 11, each of which is endless or extends completely around the drum, intersect the periphery of the drum by a continuous slot 12 which is considerably narrower than the diameter of the cavity. The width of this slot 12 preferably has a fixed relation to the diameter of the cavity 11 and is made as small as possible since it is desired that the greatest possible portion of the cavity be formed in the drum and a minimum portion by a part exteriorly of the drum whether it be in the form of a traveling belt or a stationary shoe. By important features of the present invention this slot, which is for the purpose of admitting the raw stock and removing the finished sponge cord, can be made narrow enough that, notwithstanding the presence of the slot and the member which closes it during the blowing and vulcanizing periods, the cord will not have any perceptible or material flat portion where the slot occurs and where the slot is closed by a member engaging the periphery of the drum. I find that for a cord which is ½ inch in diameter the slot can be made about $\frac{3}{16}$ inch in width.

For convenience in machining the cavities 11 in the drum 10, the drum is preferably formed of an outer portion composed of a series of rings 10a tightly fitted onto an inner portion 10b in the form of an inner drum composed of a continuous cylindrical portion and two end heads or end housings 10c. Each cavity 11 is formed one-half in one ring 10a and one-half in an adjoining ring 10a. The heads 10c have hollow trunnions 10d which are rotatably supported in standards 13 of a frame which, in addition to the standards, includes a base 14 from which the standards extend vertically at opposite ends of the drum.

Figure 2:
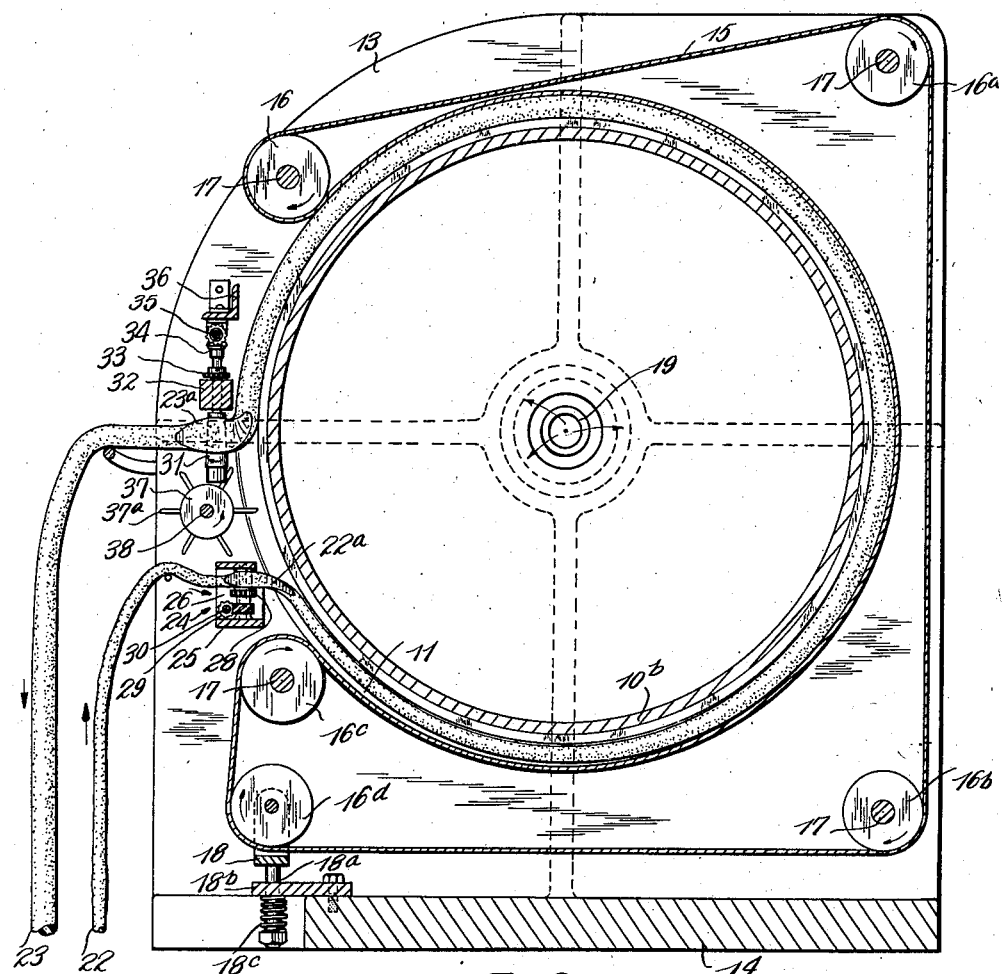
Fig. 2 is a transverse sectional view substantially along the line 2—2 of Fig. 1.

The slots 12 are closed for a suitable portion of the periphery of the drum by any suitable means, but in this instance by endless belts or bands 15 one of which is provided for each cavity. These belts are preferably formed of flexible metal but may in some instances be formed of other material, such as canvas. As best shown in Fig. 2, the belts engage the periphery of the drum for about three-fourths of its circumference and they engage the outer surface of the drum tightly enough so that they are driven by and travel with the drum by the frictional engagement between the belts and the drum.

The belts are in this instance supported on a series of idler pulleys, in this case five for each belt, designated respectively 16, 16a, 16b, 16c, and 16d. The pulleys 16, 16a, 16b, and 16c are mounted on shaft or rods 17 which are supported by the standards 13 of the drum supporting frame. The pulleys 16d are separately supported in yokes 18 (see Figs. 1 and 2) having stems 18a extending down through a plate 18b on the base 14 of the frame and carrying below the plate 18b tensioning springs 18c which cause the pulleys 16d to maintain a substantially uniform tension in the several belts 15.

While I prefer to close the slots 12 for the requisite portion of the periphery of the drum by means of separate traveling belts for the various cavities, I do not regard this as an essential feature of the invention. For example, I have contemplated using a single belt for a plurality of cavities or for all the cavities particularly if the number of cavities is not too great to make this practicable. I also contemplate closing the cavities by a stationary shoe which will engage and fit closely the outer periphery of the drum, and this I regard as feasible if the shoe or the inner surface thereof which engages the drum is made of a material which has a low coefficient of friction with the surface of the drum and with the material in the cavities thereof.

The drum is heated preferably by passing steam therethrough from one hollow trunnion 10d to the other. In this instance the steam is supplied through the lefthand trunnion of Fig. 1 by means of a stationary steam supply pipe 19 which extends through a suitable packing gland 20 carried by this trunnion. The steam is exhausted from the drum through a stationary outlet pipe 21 which extends through the righthand trunnion a portion of which is indicated in Fig. 1 and which will carry a suitable packing gland similar to the gland 20. The steam supply pipe 19 may extend simply through the trunnion and deliver the steam at substantially the center line of the drum, but the outlet pipe is preferably extended downward and is made L-shaped with its free end near the bottom of the drum so as to carry away condensate along with the exhaust steam.

The raw stock which is fed into each of the cavities 11 is in the form of raw uncured cord round in cross-section such as is customarily produced by the dies of an extruding machine. In making the raw stock used with my invention, the usual ingredients including the usual blowing agent may be employed. Also the mill for mixing the ingredients and for extruding the raw stock may be such as is customarily utilized. This raw stock fed to each cavity is designated 22 in Figs. 2, 5, and 6 of the drawings and is generally of considerable and indeterminate length. The finished sponge cord is designated 23 in Figs. 2, 7, and 8. The raw stock is fed to and the finished sponge cord is removed from the uncovered portion of the cavity between the upper idler roller 16 and the lower idler roller 16c. The raw stock is preferably supplied to the cavity a short distance above the lower idler roller 16c so that the initial heating and expanding of the stock by the gas liberated from the expanding ingredient will occur in the lower quarter of the cavity.

The slot 12 at the outer portion of each cavity 11 is desirably narrower than the diameter of the raw stock 22. Furthermore, the stock as it comes from the dies of the extruding machine is not always of uniform diameter and is not always of uniform cross-sectional shape, both of which facts with present practices or methods of producing sponge cord cause sections of cord to be imperfect and require close inspection and frequent cutting and scrapping of the imperfect portions. These disadvantages are overcome by one of the important features of the present invention by which at the point of ingress of each strip 22 of raw stock into a cavity 11 the stock is simultaneously flattened, calibrated and fed into the cavity at the correct rate of speed with respect to the rate of speed of the drum measured at the circumferential axis of the cavity. These results are accomplished by supplying the raw stock 22 to a flattening, calibrating and feeding unit 24 which is supported close to the drum at the point where the stock enters the cavity. In Fig. 1 I have shown two of these units in proper relation with respect to two of the cavities with which they function, but it will be understood that similar units will be provided for all the cavities. The units may be supported by any suitable means, but in this instance are supported on a horizontal plate 25 a portion only of which is shown in the drawings and which extends between and is secured to the two standards 13 of the drum supporting frame.

Figures 3, 4:
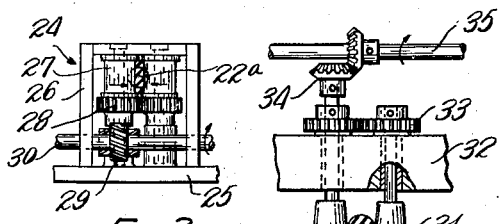
Fig. 3 is a somewhat enlarged elevational view of mechanism which is associated with each cavity of the drum for the purpose of flattening, calibrating, and feeding the raw stock into the cavity.
Fig. 4 is a similar view of a takeout mechanism which is associated with each cavity of the drum and serves to remove the vulcanized completed cord from the cavity and to flatten the cord so that it can be removed without damage to the cord by contacting the edges of the slot of the cavity.

By reference to Figs. 1, 2, and 3 (the latter view showing the unit detached and on a somewhat larger scale than Figs. 1 and 2), it will be seen that the unit is composed of a suitable frame 26 mounted on the supporting plate 25 which supports all the units, as previously stated. This frame 26 carries two flanged rollers 27 mounted on vertical pins and geared together by one-to-one spur gearing 28 so that they will rotate at the same speed. The vertical pin carrying one of the rollers is driven by suitable gearing, such as spiral gearing 29, from a driving shaft 30 which extends across in front of the drum, being supported by the standards 13 of the drum supporting frame as indicated in Fig. 1 and serving to simultaneously rotate the flanged rollers 27 of all the units.

Figures 5, 6:
Fig. 5 is a view of a short section of the raw stock as it is received from the extruding machine and is continuously fed to the cavity.
Fig. 6 shows a section of the stock flattened preparatory to entering the open slot of the cavity.

The two rollers 27 of the unit are symmetrically located with respect to the center line of the slot 12 of the corresponding cavity 11 and the peripheries of the two rollers and the flanges at the ends thereof form a vertically elongated rectangularly shaped cavity which flattens the stock as indicated at 22a in Figs. 2 and 6 and as shown in cross-section at 22a in Fig. 3, the width of the flattened section 22a as it passes through the rollers being somewhat less than the width of the slot 12 of the cavity 11 so that the stock will be able to pass freely through the slot into the cavity, as indicated in Fig. 2. Additionally, these flanged rollers calibrate the stock so that it is made of uniform cross-section at the point immediately in advance of the point of entrance to the cavity, and, furthermore, the rotation of the driving shaft 30 for the various units is such that the rollers feed the stock into the cavity of the rotating drum at the proper rate suitable for the rate of rotation of the drum in order to avoid stretching or piling up of the stock in the drum cavity.

The stock 22 retains its flattened condition until it passes through the slot 12 of the cavity of the heated drum and again assumes its round shape shortly after entering the cavity. Thereupon the expanding or blowing and also the vulcanization of the stock gradually take place as the stock is carried around with the drum substantially in the manner indicated in Fig. 2, and before the stock reaches that part of the periphery of the slot which is not covered by the band 15, the blowing and vulcanization are completed.

To remove the vulcanized sponge cord 23 from the cavity without damage to the same, the following takeout mechanism is provided for each cavity, this mechanism for two of the cavities being shown in Fig. 1 and for one cavity being shown in the cross-sectional view of Fig. 2. Additionally, it is shown detached on a somewhat enlarged scale in Fig. 4 to which reference will now be had.

The takeout mechanism for each cavity is in the form of a unit located directly above the feeding unit and closely adjacent to the periphery of the drum, as clearly shown in Fig. 2. The unit comprises two adjacent rollers 31 mounted on vertical spindles suitably supported in a bar 32 which extends between and is secured at its ends to the standards 13 of the drum frame. The spindles are rotated at the same speed by one-to-one ratio spur gearing 33 and one of the spindles is driven by any suitable form of gearing, such as bevel gearing 34, from a horizontal shaft 35 on the lower side of a horizontal support, in this instance in the form of an angle 36 extending between and secured to the standards 13.

Figures 7, 8:
Fig. 7 is a view of a short section of the enlarged vulcanized sponge cord just prior to being removed from the cavity.
Fig. 8 is a view showing how it is flattened while being removed from the cavity.

The rollers 31 are arranged as closely as possible to the periphery of the drum and are symmetrically disposed with reference to the center of the slot 12 of the cavity for which the unit functions. The completed sponge cord 23 passes from the cavity between these rollers and in so doing the cord is flattened, as indicated in Figs. 2, 4, and 8, a portion of the flattened section extending into the cavity so that the cord will pass through the slot 12 without being abraded by the edges of the slot. It is not necessary that the cord be flattened to a thickness equal to or less than the width of the slot, but only that it be flattened sufficiently that the pressure resulting from drawing it through the slot will not damage the cord. The flattening action of the rollers 31 and in fact the flattened area are indicated at 23a in Figs. 2, 4, and 8. It will be noted that the rollers 31 are somewhat tapered for a purpose to be explained presently.

Associated with the rollers of each takeout unit is a takeout wheel 37 mounted on a rotating shaft 38 which is supported at its ends by the standards 13, this shaft being located slightly below the rollers 31. Each wheel has fingers 37a which are of less width than the width of the slot 12 of the cavity, and as this wheel rotates, these fingers extend through the slot into the cavity and as they rotate they pass between the lower ends of the rollers 31. This takeout wheel does not function while a continuous strip of cord is being removed from the drum, but its purpose is to start the takeout action of the rollers by engaging the end of the cord in the cavity and lifting it out and causing it to pass between the rollers. Thereafter the wheel does not function until another strip of raw stock is passed through the machine or if by chance the cord should break.

As the end of the cord is lifted by one of the fingers of the takeout wheel and inserted between the rollers, it is immediately acted upon by the rollers to continuously remove the cord from the cavity. By reason of the fact that tapered rollers are employed, the cord will immediately climb up to a wider space between the rollers above the plane of the fingers of the rotating takeout wheel so that there will be no danger of the cord being damaged by contact with the rotating fingers of the takeout wheel. The cord will climb up between the rollers to a point such that the rate of outfeed of the cord from the cavity under the pulling action of the rolls will be the same as the rate of movement of the cord in the cavity so that the cord will not be unduly stretched as it is removed from the cavity by the takeout unit, and the feeding action of the rollers will not lag behind the rate of travel of the cord while it is in the cavity so that there will be no likelihood of the cord piling up in the cavity or looping down in the path of movement of the fingers of the wheel 37. If for any reason there should be any variation in the relative rate of movement of the cord from the slot of the cavity and the rotation of the rollers, the cord will automatically move (up or down) to a point between the rollers where the surface speed of the rollers is the same as the speed of the cord in the cavity. In other words, the cord will automatically move up or down so as to decrease or increase the feed of the cord under the action of the rollers so as to compensate for any variation (if it should occur) between the speed of rotation of the rollers and the speed or rate of movement of the cord in the cavity.

Thus this takeout unit removes the cord from the cavity at the proper rate and it gives the cord a flattened area which extends into the cavity as indicated in Fig. 2 so that it can be withdrawn from the cavity through the narrow slot without damage to the cord, as previously explained.

There may be a series of takeout fingers 37a for each of the different takeout units all mounted on a continuous hub rotated by shaft 38 or each takeout wheel may have its individual hub or two or more of them may have a common hub as indicated in Fig. 1.

The manner in which the drum and the shafts 30, 35, and 38 are rotated is immaterial to the invention, it being important only that these parts and the drum be continuously rotated so that the raw stock 22 will be blown and completely vulcanized substantially between the point of ingress of the stock and before the sponge cord reaches the takeout mechanism and that the speeds of the shafts 30, 35, and 38 be so coordinated with the speed of rotation of the drum that the raw stock will be supplied and the finished cord will be removed at the proper rates of speed.

I prefer to use a single motor for rotating the drum and the three shafts with the proper reducing gearing and the necessary provision for speed adjustment. In Fig. 1 portions of two speed reducing gear units are indicated at 39 and 40 both of which units will be suitably geared to the driving motor which is not shown. The reducing unit 39 is connected by reducing spur gearing 41 to one of the trunnions of the drum while the unit 40 is here shown as connected by chain and sprocket gearing indicated generally by the reference character 42 to the shafts 30, 35, and 38. However, these methods of driving are of course not essential and may be modified as conditions require.

In operation, steam at the desired temperature will be passed continuously through the drum from the stationary steam supply pipe 19 extending through one of the hollow trunnions 10b and will leave the drum by the stationary exhaust pipe 21 extending through the other trunnion of the drum. Of course the steam temperature and the rate of flow will be such as to obtain the right blowing and vulcanizing action between the point of supply of the raw stock and a point somewhat in advance of the plate of removal of the finished cord, generally at or about the point where the band 18 passes around the roller 16 and leaves the periphery of the drum. The functioning of the remainder of the apparatus need not be here repeated, and it will be sufficient to state that by the herein described method and apparatus an excellent grade of sponge cord uniform in quality is produced continuously and economically or at low cost and therefore that the objects of the invention stated at the beginning of the specification are attained very effectively.

I do not desire to be confined to the precise steps of the method or to the precise mechanisms herein illustrated but aim in my claims to cover all modifications which do not involve a departure from the spirit and the scope of the invention. For example, while my invention is especially adapted for the production of sponge cord, features or parts thereof may be utilized for the production of other rubber products and, in fact, for the production of products formed from plastics other than rubber.

Having thus described my invention, I claim:

1. Apparatus of the character described comprising a rotary drum having a continuous cavity extending around the same adjacent to its periphery and having a peripheral slot communicating with the cavity and narrower than the maximum width of the cavity, and means for introducing into the cavity raw stock which is wider than the slot and for changing its shape adjacent to the slot so that it will pass therethrough.

2. Apparatus of the character described comprising a rotary drum having a continuous cavity extending around the same adjacent to its periphery and intersecting the periphery by a slot which is narrower than the maximum width of the cavity, and feed mechanism for supplying raw stock of intermediate length to said cavity and having means for flattening the stock just before it enters the cavity.

3. Apparatus of the character described comprising a rotary drum having a continuous cavity extending around the same adjacent to its periphery and intersecting the latter by a slot which is narrower than the maximum width of the cavity, and feed mechanism for supplying raw stock of indeterminate length to said cavity and having means for flattening and calibrating the stock just before it enters the cavity.

4. Apparatus of the character described comprising a rotary drum having a continuous cavity extending around the same adjacent to its periphery and having a peripheral slot communicating with the cavity and narrower than the maximum width of the cavity, and feed mechanism for supplying raw stock of indeterminate length to said cavity, said mechanism including a pair of adjacent rollers between which the stock is adapted to pass and defining a substantially closed calibrating opening of predetermined shape and cross-sectional area.

5. Apparatus of the character described comprising a rotary drum adapted to be heated, a continuous cavity extending around the drum adjacent to its periphery and having a peripheral slot communicating with the cavity and narrower than the maximum width of the cavity, and takeout mechanism for withdrawing the cured stock from the cavity at a predetermined point with reference to the periphery of the drum and including means for flattening the stock so that it may readily pass through said slot.

6. Apparatus of the character described comprising a rotary drum having a continuous cavity extending around the same adjacent to its periphery and intersecting the periphery forming a slot which is narrower than the maximum width of the cavity, and takeout mechanism for withdrawing the cured stock from the cavity at a predetermined point with reference to the periphery of the drum and including a pair of rollers for flattening the said stock so that it may be readily withdrawn from the cavity through said slot.

7. Apparatus of the character described comprising a rotary drum adapted to be heated, a continuous cavity extending around the drum adjacent to its periphery and having a peripheral slot communicating with the cavity and narrower than the maximum width of the cavity, and takeout mechanism for withdrawing the cured stock from the cavity at a predetermined point with reference to the periphery of the drum and including a pair of rollers for flattening the stock so that it may be readily withdrawn from the cavity through said slot, and pickup means for engaging the oncoming end of the vulcanized stock and for presenting it to the rollers.

8. Apparatus of the character described comprising a rotary drum adapted to be heated, a continuous cavity extending around the drum adjacent to its periphery and having a peripheral slot which is narrower than the maximum width of the cavity and communicates therewith, means extending partway around the periphery of the drum in engagement therewith and serving to close the cavity for a portion of its length leaving an uncovered portion for supplying raw stock to the cavity and for removing the finished product, and feed mechanism and takeout mechanism both located adjacent to the drum at said last named portion, each of said feed and takeout mechanisms including a pair of flattening rollers one pair for reducing the diameter of the raw stock and the other for reducing the diameter of the cured stock to facilitate the passage thereof through said slot.

9. Apparatus of the character described comprising a rotary drum having a continuous peripheral groove extending around the same, means extending partway around the drum for closing the groove, said means together with the groove forming a substantially round cavity in which a length of round stock is adapted to be cured, the raw stock being supplied to the groove at one point and the cured stock removed at another point, means for supplying to the apparatus round stock to be cured, and means for flattening the raw stock just before it enters the groove.

10. Apparatus of the character described comprising a rotary drum having a continuous peripheral groove extending around the same, means extending partway around the drum for closing the groove, said means together with the groove forming a substantially round cavity in which a length of round stock is adapted to be cured, the raw stock being supplied to the groove at one point and the cured stock removed at another point, means for supplying to the apparatus round stock to be cured, and means for calibrating the raw stock just before it enters the groove.

11. Apparatus of the character described comprising a rotary drum having a continuous peripheral groove extending around the same, means extending partway around the drum for closing the groove, said means together with the groove forming a substantially round cavity in which a length of round stock is adapted to be cured, the raw stock being supplied to the groove at one point and the cured stock removed at another point, means for supplying to the apparatus round stock to be cured, and means for flattening the cured stock at the point of egress thereof from the groove.

MARION W. HUMPHREYS.